(12) United States Patent
Hohmann et al.

(10) Patent No.: US 7,704,055 B2
(45) Date of Patent: Apr. 27, 2010

(54) SWITCHING DEVICE FOR A HYDRAULIC HIGH-PRESSURE SYSTEM

(76) Inventors: Jörg Hohmann, Uhlandstrasse 6a, 59872 Meschede (DE); Frank Hohmann, Josef-Menke-Str., 59851, Warstein (DE)

( * ) Notice: Subject to any disclaimer, the term of this patent is extended or adjusted under 35 U.S.C. 154(b) by 289 days.

(21) Appl. No.: 11/570,007

(22) PCT Filed: Apr. 29, 2005

(86) PCT No.: PCT/EP2005/004628

§ 371 (c)(1),
(2), (4) Date: Dec. 4, 2006

(87) PCT Pub. No.: WO2005/118225

PCT Pub. Date: Dec. 15, 2005

(65) Prior Publication Data

US 2007/0266829 A1     Nov. 22, 2007

(30) Foreign Application Priority Data

Jun. 4, 2004    (DE) ................ 10 2004 027 413

(51) Int. Cl.
*F04B 49/03* (2006.01)
(52) U.S. Cl. ........................................... 417/286
(58) Field of Classification Search ............... 137/455
See application file for complete search history.

(56) References Cited

U.S. PATENT DOCUMENTS

| | | | |
|---|---|---|---|
| 833,062 A | 10/1906 | Krichbaum | |
| 1,511,300 A | 10/1924 | Robinson | |
| 2,426,692 A * | 9/1947 | Katz | 91/435 |
| 3,814,375 A | 6/1974 | Grotloh | 251/28 |
| 4,957,330 A * | 9/1990 | Morikawa et al. | 303/115.4 |
| 5,398,719 A | 3/1995 | Drossel et al. | 137/489.5 |
| 5,462,343 A * | 10/1995 | Yoshida et al. | 303/114.1 |
| 5,699,664 A * | 12/1997 | LaFleur | 60/307 |
| 6,293,765 B1 | 9/2001 | Peterson | 417/288 |
| 2005/0242310 A1* | 11/2005 | Takiguchi et al. | 251/28 |

FOREIGN PATENT DOCUMENTS

| | | | | |
|---|---|---|---|---|
| DE | 2202959 | | 8/1973 | |
| DE | 3312788 A1 | | 10/1984 | |
| FR | 2 580 742 | | 10/1986 | |
| GB | 2103727 | * | 2/1983 | 137/455 |
| JP | 57043074 | * | 3/1982 | 137/455 |
| JP | 5223013 | * | 8/1993 | 137/455 |
| WO | WO 97/04262 | | 2/1997 | |

OTHER PUBLICATIONS

International Search Report PCT/EP2005/004628 dated Aug. 18, 2005 (European Patent Office).

* cited by examiner

*Primary Examiner*—Devon C Kramer
*Assistant Examiner*—Bryan Lettman
(74) *Attorney, Agent, or Firm*—Ostrolenk Faber LLP

(57) ABSTRACT

The invention relates to a switching device for a hydraulic high-pressure system, particularly for operating hydraulic screw-tightening devices, comprising: a directional seat valve (17), which is subjected to the action of high pressure in the closing direction; a control piston (22), which can be subjected to the action of low pressure and which displaces the directional seat valve in the opening direction, and, a control valve (23), which either establishes or interrupts a connection to a pressureless low-pressure return flow line.

5 Claims, 1 Drawing Sheet

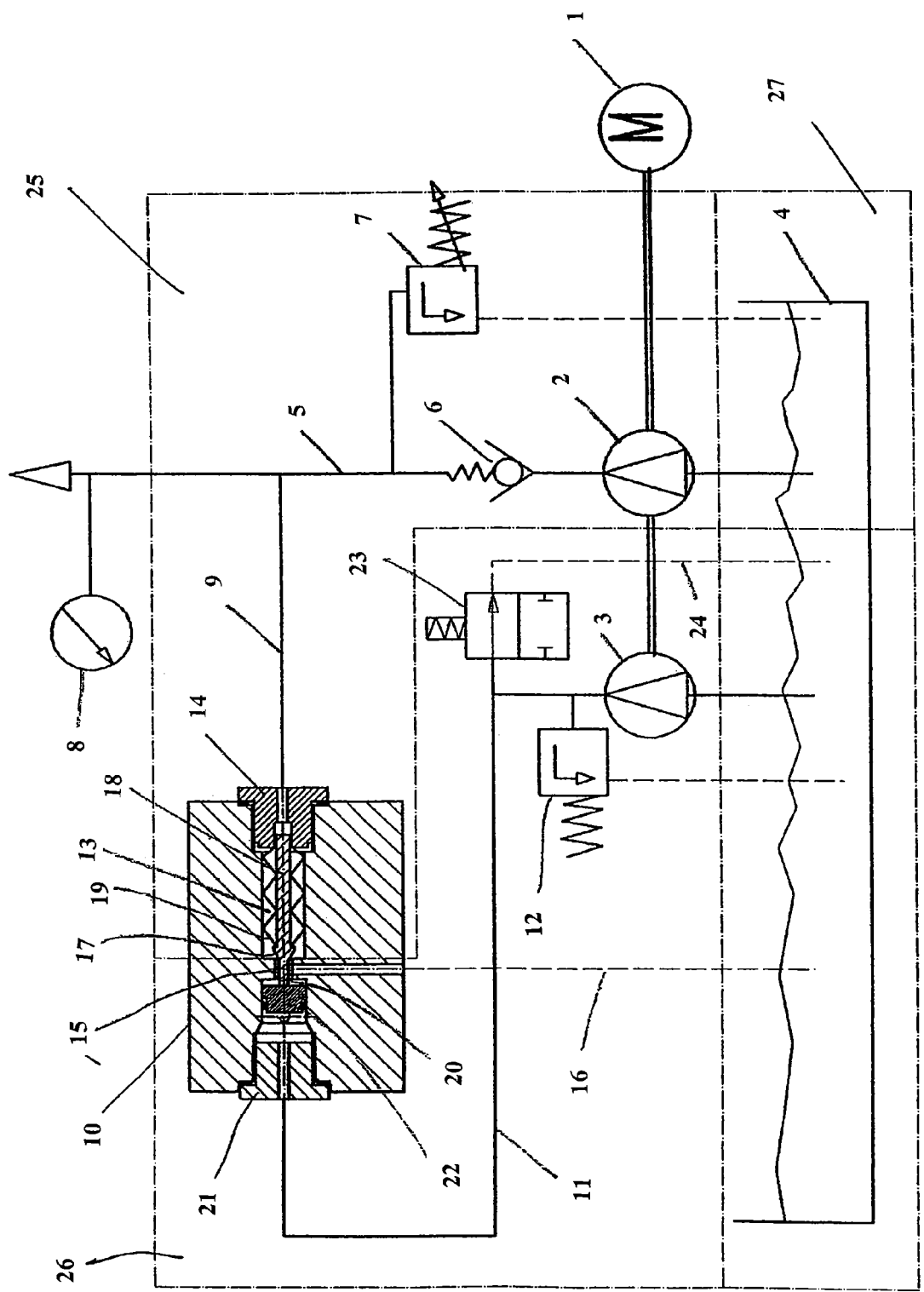

US 7,704,055 B2

SWITCHING DEVICE FOR A HYDRAULIC HIGH-PRESSURE SYSTEM

CROSS REFERENCE TO RELATED APPLICATION

The present application is a 35 U.S.C. §§371 national phase conversion of PCT/EP2005/004628, filed 29 Apr. 2005, which claims priority of German Patent Application No. 10 2004 027 413.4 filed 4 Jun. 2004, which is herein incorporated by reference. The PCT International Application was published in the German language.

BACKGROUND OF THE INVENTION

The invention relates to the use of a switching device for a hydraulic high-pressure system for the operation of hydraulic screw-tensioning appliances.

Hydraulic high-pressure systems are employed for various purposes in many sectors of industry. One field of use is the operation of various tools. These tools should be as small and as handy as possible and be capable of applying very high forces. Examples of tools of this type are hydraulic screw-tensioning appliances. On account of the small construction volume which is desired, it is necessary for the pressure selected in a high-pressure system to be correspondingly high in order to achieve the required forces. The pumps used for this purpose deliver pressures of between 700 and 3000 bar. Valves available hitherto on the market for the control of pressures of more than 1000 bar are designed as hand-operated shut-off valves, whereas, for pressures of up to 1000 bar, directional seat valves actuated directly by means of electro-magnetics are known.

As the designation indicates, hand-operated shut-off valves cannot be controlled remotely, while, because of the high forces required for opening or closing, the directly actuated solenoid valves have a very large and heavy build, but are still unsuitable for a pressure of more than 1000 bar.

SUMMARY OF THE INVENTION

WO-A-97/042062 describes a pilot-controlled hydraulic closing valve with a control bore which is in the form of a blind hole in a valve housing and into which an inflow connection A and, at a distance from the inflow connection A, an outflow connection B issue at the closed end of the control bore, with a valve seat which is designed concentrically in the control bore between the connections A and B and has a sealing face with a seat cross section F1, and with a control piston having at one end an end collar with a sealing face which cooperates with the sealing face of the valve seat, the end collar being connected by means of a piston shank to a middle collar which shuts off the control bore at the end adjacent to the connection B and is guided sealingly in the valve housing, in which hydraulic closing valve the piston shank penetrates through the valve seat, the sealing face of the end collar lies opposite the middle collar and the sealing face of the valve seat faces the inflow of the connection A, so that the control piston and the valve seat cooperate in a closing sense in the direction A toward B. The control piston is connected at the end of the middle collar to a pilot controlled collar which is guided sealingly in the valve housing in a pilot controlled bore, the pilot controlled bore being concentrically connected at one end to the control bore, and being closed at an opposite end by means of a cover, and a pilot control chamber formed between the pilot controlled collar and the cover being capable of being acted upon by a pressure medium by means of a hydraulically, pneumatically or electromagnet-hydraulically actuated pilot control device.

The object on which the invention is based is to provide a switching device for a hydraulic high-pressure system for the operation of hydraulic tensioning appliances, said switching device having a small construction volume and being suitable for remote control pressures of more than 1,000 to 3,000 bar and above.

Proceeding from this set object, what is proposed is the use of a switching device for a hydraulic high-pressure system for the operation of hydraulic screw-tensioning appliances, with a directional seat valve acted upon in a closing direction by high pressure from a high-pressure source and having a high-pressure space connected to a high-pressure line, said directional seat valve closing a pressureless high-pressure backflow line under the action of high pressure, with a control piston displacing the directional seat valve in the opening direction to make a connection between the high-pressure line and the high-pressure backflow line when said control piston is acted upon in a controlled way by low pressure from a low-pressure source, with a randomly controllable switching valve which selectively makes or breaks a connection to a pressureless low-pressure backflow line and which, when the connection to the low-pressure backflow line is broken, brings about action upon the control piston by low pressure from the low-pressure source and, as a result, the displacement of the directional seat valve in the opening direction, and with a motor which drives a high-pressure pump and a low-pressure pump, coupled to it, for the low-pressure control circuit.

Since the switching valve controls only the low pressure for the control piston, it can be designed as a simple solenoid valve which can be controlled remotely by cable or by radio. The control piston capable of being acted upon in a controlled way by low pressure can be designed in terms of diameter such that it is capable of opening the directional seat valve acted upon by high pressure, even though the arrangement can have a space-saving and lightweight design.

The switching device can be arranged in a particularly space-saving way if the directional seat valve consists of a valve block with a high-pressure space connected to a high-pressure line and with a valve cone closing a pressureless backflow line under the action of high pressure, the control piston being arranged in the valve block coaxially with respect to the valve cone.

The valve cone may in this case rest on a valve seat formed by a reduction in diameter of the cylindrical high-pressure space, while a valve tappet on the valve cone is led through a bore corresponding to the reduction in diameter and is acted upon by the control piston, the backflow line emanating from the bore.

Furthermore, what contributes to the compactness of the switching device is that one motor drives a high-pressure pump for the high-pressure system and a low-pressure pump, coupled to it, for the low-pressure control circuit.

The invention is explained in more detail below with reference to an exemplary embodiment illustrated in the drawing.

A drive motor 1, generally an electric motor, drives a high-pressure pump 2 and a low-pressure pump 3 coupled to it. Both pumps 2, 3 extract hydraulic fluid from a tank 4. The high-pressure pump 2 conveys via a nonreturn valve 6 into a high-pressure line 5 in which the pressure can be set to a pressure of up to 3000 bar by means of a settable pressure valve 7. The pressure prevailing in the high-pressure line 5 can be read off on a pressure measurement instrument 8. The high pressure prevails in the high-pressure line 5 only as long as a branch line 9 is not connected to a pressureless high-pressure backflow line 16 leading back to the tank 4. The relief of pressure of the high-pressure line 5 is brought about by a valve cone 17 arranged in a valve block 10. This valve cone 17 is arranged in a high-pressure space 13 of the valve block 10 and is acted upon by high pressure via the branch line 9 connected to a plug 14. The valve cone 17 is guided by means of a guide shank 18 and is acted upon in the closing direction by the pressure in the high-pressure line 5 and the branch line 9 and by a spring 19. The valve cone 17 rests on a step which is formed by a bore 15 of reduced diameter which is coaxial with respect to the cylindrical high-pressure space 13. The pressureless high-pressure backflow line 16 branches off from the bore 15 and is led back to the tank 4.

A valve tappet 20 connected to the valve cone 17 projects through the bore 15 and is acted upon by a control piston 22 arranged coaxially with respect to the bore 15 and to the valve cone 17. The control piston 22 is guided, sealed off, in a corresponding bore in the valve block 10 and can be acted upon on the side facing away from the valve cone 17, via a low-pressure line 11 and a bore in a plug 21, by low pressure delivered by the low-pressure pump 3.

The pressure in the low-pressure line 11 is regulated by means of a pressure valve 12 to a pressure which is set such that the control piston 22, which has a larger diameter than the bore 15, is capable of displacing the valve cone 17 in the opening direction counter to the high pressure in the high-pressure space 13. This is brought about in that a solenoid valve 23 arranged in a low-pressure backflow line 24 and connected to the low-pressure line 11 is closed out of the open position illustrated, in which the hydraulic fluid delivered by the low-pressure pump 3 flows directly back into the tank 4 again via the low-pressure back flow line 24, with the result that the pressure, set by the pressure valve 12, builds up in the low-pressure line 11, displaces the control piston 22 and thereby likewise displaces the valve tappet 20, with the result that the valve cone 17 is lifted off from its seat and the connection between the high-pressure line 5 and the pressureless high-pressure backflow line 16 is made.

Only low forces are required in order to actuate the solenoid valve 23, and therefore this solenoid valve 23 has a very small build. The valve block 10 can likewise be implemented with small dimensions, since it needs to receive only the control piston 22 and the valve cone 17 with its guide shank 18 and with the valve tappet 20.

On account of the low forces required for actuating the solenoid valve 23, easy remote control by means of cable or radio is possible, so that only one person is required in order to operate a hydraulic screw-tensioning appliance, whereas two operators have hitherto had to be present, of whom one operated the hydraulic screw-tensioning appliance and the other had to operate the hand-operated shut-off valve on the high-pressure hydraulic pump.

The invention claimed is:

1. A hydraulic system for the operation of hydraulic screw-tensioning appliances, the hydraulic system comprising:
    a high-pressure system;
        the high-pressure system including;
            a high-pressure pump delivering a hydraulic fluid at a constant high pressure, settable by means of a settable pressure valve to a first high pressure line connected to the high pressure pump and directly to a hydraulic screw tensioning appliance;
            a high-pressure space;
            a second high-pressure line connecting the first high-pressure line to the high-pressure space;
            a directional seat valve arranged in the high-pressure space and movable between an open position and a closed position,
            a bore cooperating with the directional seat valve; and
            a constantly pressureless high-pressure backflow line connected to the bore,
        wherein the directional seat valve is constantly and directly acted upon in a closing direction toward the closed position by high pressure from the high-pressure pump thereby closing the bore and interrupting a connection between the high-pressure space and the constantly pressureless high-pressure backflow line,
    a low-pressure control circuit, hydraulically separate from said high-pressure system,
        the low-pressure control circuit including:
            a low-pressure pump delivering a hydraulic fluid at a constant low pressure, settable by means a pressure valve to a low-pressure line connected to the low-pressure pump;
            a control piston connected to the low-pressure line;
            a randomly controllable switching valve connected to the low-pressure pump constantly making a connection to a constantly pressureless low-pressure backflow line as long as the randomly controllable switching valve is in an open position,
        wherein the randomly controllable switching valve is operable to be closed thereby selectively breaking the connection between the low-pressure line and the constantly pressureless low-pressure backflow line, and
        the control piston acts upon the directional seat valve to displace the directional seat valve in an opening direction toward the open position to make a connection between the first high-pressure line and the constantly pressureless high-pressure backflow line via the second high-pressure line and the high-pressure space when the control piston is acted upon in a controlled way by low-pressure from the low-pressure pump via the low-pressure line to displace the directional seat valve in the opening direction based on operation of the randomly controllable switching valve toward the closed position, and
    a motor operable to drive the high-pressure pump and the low-pressure pump.

2. The use of the switching device as claimed in claim 1, in which the directional seat valve consists of a valve block with a high-pressure space connected to the high-pressure line and with a valve cone closing the constantly pressureless high-pressure backflow line under the action of high pressure, the control piston being arranged in the valve block coaxially with respect to the valve cone.

3. The use of the switching device as claimed in claim 2, in which the valve cone rests on a valve seat formed by a reduction in diameter of the cylindrical high-pressure space, a valve tappet on the valve cone is led through the bore corresponding to the reduction in diameter and is acted upon by the control piston, and the high-pressure backflow line emanates from the bore.

4. The use of the switching device as claimed in claim 1, in which the switching valve is a remotely controllable solenoid valve.

5. The use of the switching device as claimed in claim 1, in which the switching valve is arranged in the low-pressure backflow line.

* * * * *